(12) United States Patent
Droche et al.

(10) Patent No.: US 7,607,632 B2
(45) Date of Patent: Oct. 27, 2009

(54) DEVICE FOR FIXING A FASTENING RING TO A SUPPORT MEMBER AND SUPPORT INCLUDING IT

(75) Inventors: Emile Droche, La Garenne Colombes (FR); Jean-Pierre Lesecq, Cormeilles En Parisis (FR)

(73) Assignee: ITW de France, Beauchamp (FR)

( * ) Notice: Subject to any disclaimer, the term of this patent is extended or adjusted under 35 U.S.C. 154(b) by 473 days.

(21) Appl. No.: 11/371,047

(22) Filed: Mar. 9, 2006

(65) Prior Publication Data

US 2006/0207447 A1     Sep. 21, 2006

(30) Foreign Application Priority Data

Mar. 16, 2005   (FR) .................................. 05 02607

(51) Int. Cl.
*B65D 63/00*      (2006.01)
*A47B 97/00*      (2006.01)
(52) U.S. Cl. ........................ 248/500; 248/499
(58) Field of Classification Search ................. 248/499, 248/500; 403/60, 78, 164; 294/1.1
See application file for complete search history.

(56) References Cited

U.S. PATENT DOCUMENTS

| | | | | |
|---|---|---|---|---|
| 3,143,916 A | | 8/1964 | Rice et al. | |
| 3,297,293 A | * | 1/1967 | Andrews et al. | 248/499 |
| 4,179,151 A | * | 12/1979 | Tye | 294/89 |
| 4,431,352 A | * | 2/1984 | Andrews | 410/101 |
| 4,592,686 A | * | 6/1986 | Andrews | 410/101 |
| 4,705,422 A | * | 11/1987 | Tsui et al. | 403/60 |
| 5,586,801 A | * | 12/1996 | Sawyer et al. | 294/1.1 |
| 6,138,975 A | * | 10/2000 | McDaid | 248/499 |
| 6,161,883 A | * | 12/2000 | Pearl | 294/1.1 |
| 6,398,447 B1 | * | 6/2002 | Pearl | 403/164 |

FOREIGN PATENT DOCUMENTS

FR      2 756 334 A     5/1998

* cited by examiner

*Primary Examiner*—Amy J Sterling
*Assistant Examiner*—Steven M Marsh
(74) *Attorney, Agent, or Firm*—Lowe Hauptman Ham & Berner LLP

(57) ABSTRACT

The fixing device includes a base including elements for pivotal mounting of the ring; a foot carried by the base, including a first pair of lugs extending from the base, a cross-member disposed between the lugs, and a second pair of lugs connected to the base; and a rod adapted to enter a bore provided through the base; each of the lugs having a shoulder over the whole of the width of the lug, the shoulder forming a transition between a first section of the lug and a thinner second portion. The support includes the above device and a ring retained in the pivotal mounting elements.

15 Claims, 5 Drawing Sheets

DEVICE FOR FIXING A FASTENING RING TO A SUPPORT MEMBER AND SUPPORT INCLUDING IT

RELATED APPLICATIONS

The present application is based on, and claims priority from, French Application Number 0502607, filed Mar. 16, 2005, the disclosure of which is hereby incorporated by reference herein in its entirety.

FIELD OF THE INVENTION

The invention relates generally to devices for fixing a fastening ring to a support member.

BACKGROUND OF THE INVENTION

Such devices exist in the prior art for equipping the boot of a vehicle and include a nut welded to the sheet metal around an opening for a screw to pass through. Devices of this kind risk damaging the thread of the nut when welding or soiling it during treatment or painting and are costly to install on the vehicle.

SUMMARY OF THE INVENTION

The invention aims to provide a fastening ring fixing device that is more convenient and more economical to install on a support member.

To this end, the invention proposes a device for fixing a fastening ring to a support member, characterized in that it includes:
- a base adapted to bear on a surface bordering an opening of predetermined shape in said support member, said base including means for pivotal mounting of said ring;
- a foot carried by said base, adapted to be inserted in an axial direction into said opening in said support member and including a first pair of mutually opposed lugs extending from said base, a crossmember disposed between the lugs of said pair, and a second pair of mutually opposed lugs each connected exclusively to the base and separated by a slot, with said crossmember that faces the lugs of said second pair and that includes a wedge pointing toward said slot, with the lugs of said first pair that are adapted to bend when said crossmember is driven toward the base, and with the lugs of said second pair that are adapted to flex outward when the wedge of said crossmember is pushed into said slot; and
- a rod adapted to enter a bore formed through said base and between said lugs of said second pair and interengaging with said crossmember, to drive it toward the base;
- each of said lugs of said first pair including a first section on the side of said base whose height in said axial direction corresponds to that of said support member and a thinner second section away from said base, each of said lugs of said first pair having, internally, a shoulder transverse to said axial direction and uniform over the whole of the width of said lug, said shoulder forming a transition between said first section and said second section.

Thus the device is quick to fit without any welding being necessary.

Note that there is known from the document FR 2 756 334 a device for fixing a member to a support member including a base adapted to bear on a surface bordering an opening of predetermined shape in said support member and a foot, carried by said base, adapted to be inserted into said opening of said support member and including two pairs of lugs and a crossmember carrying a wedge.

The above device was for use with a sunshield hook, not a fastening ring. The applicant has found that a device of the above kind in which the lugs have a thicker first portion is suitable for the application to a fastening ring. This thicker first portion, which is not present in the disclosure of the document FR 2 756 334, enables the foot to support the specific shear loads of a fastening ring fixing device.

According to features that are particularly simple and convenient with regard as much to manufacture as to use:
- said base includes, on the outside of said lugs of said first pair, a bearing surface projecting on either side of those lugs; and where applicable
- each lug of said first pair is rooted on a boss of said base, each featuring said bearing surface, said base featuring a second bearing surface projecting from said bosses; and/or
- said crossmember is of plastics material and includes a body from which said wedge extends, a housing being formed in said body, said rod is of metal and threaded and said device further includes, inserted in said housing, a metal nut with which said rod is interengaged; and/or
- said means for pivotal mounting of said ring include two notches, each of said notches being adapted to receive a respective end arm of said ring; and where applicable
- each notch has an arched profile; and where applicable
- said notches are open on the side of said bearing surface and each on a respective opposite edge of said base; and/or
- said foot is disposed at the center of said base and the two notches are disposed on either side of said bore; or
- said device features in addition to said bore and said foot forming a first bore/foot assembly, a second bore/foot assembly each disposed at one end of said base; and where applicable
- said device further includes a metal blade having at each of its ends an orifice for the passage of said rod of a respective foot, said blade being engaged between said base and the head of each of said rods; and/or
- said base being generally rectangular, said pivotal mounting means include at least one notch adapted to accommodate a portion of said ring situated between said bores and oriented in the widthwise direction of said base; and where applicable
- said mounting means are open on the side of said bearing surface and on each of two opposite edges of said base; or
- said device further includes a metal blade having at each of its ends an orifice for the passage of said rod of a respective foot, said blade being engaged between said base and the head of each of said rods, and in that said pivotal mounting means comprise a notch open onto the edges of said base and onto the side of said base opposite said bearing surface, said notch being adapted to accommodate a portion of said ring, said portion being engaged between said notch and said blade; and/or
- each of said lugs includes a first bending area at the level of the shoulder, a second bending area at the level of said crossmember, and a third bending area half way between said first bending area and said second bending area, each of said lugs of said first pair includes, internally, a rib between said first bending area and said third bending area and a rib between said second bending area and said third bending area, said ribs being adapted to come into contact with each other when said lugs are bent.

The invention also proposes a fastening support including a device as explained above and a fastening ring in the form of a stirrup retained in the pivotal mounting means.

BRIEF DESCRIPTION OF THE DRAWINGS

The features and advantages of the invention will emerge from the following description given by way of nonlimiting and preferred example and with reference to the appended drawings, in which.

DETAILED DESCRIPTION OF THE DRAWINGS

Figure 1:
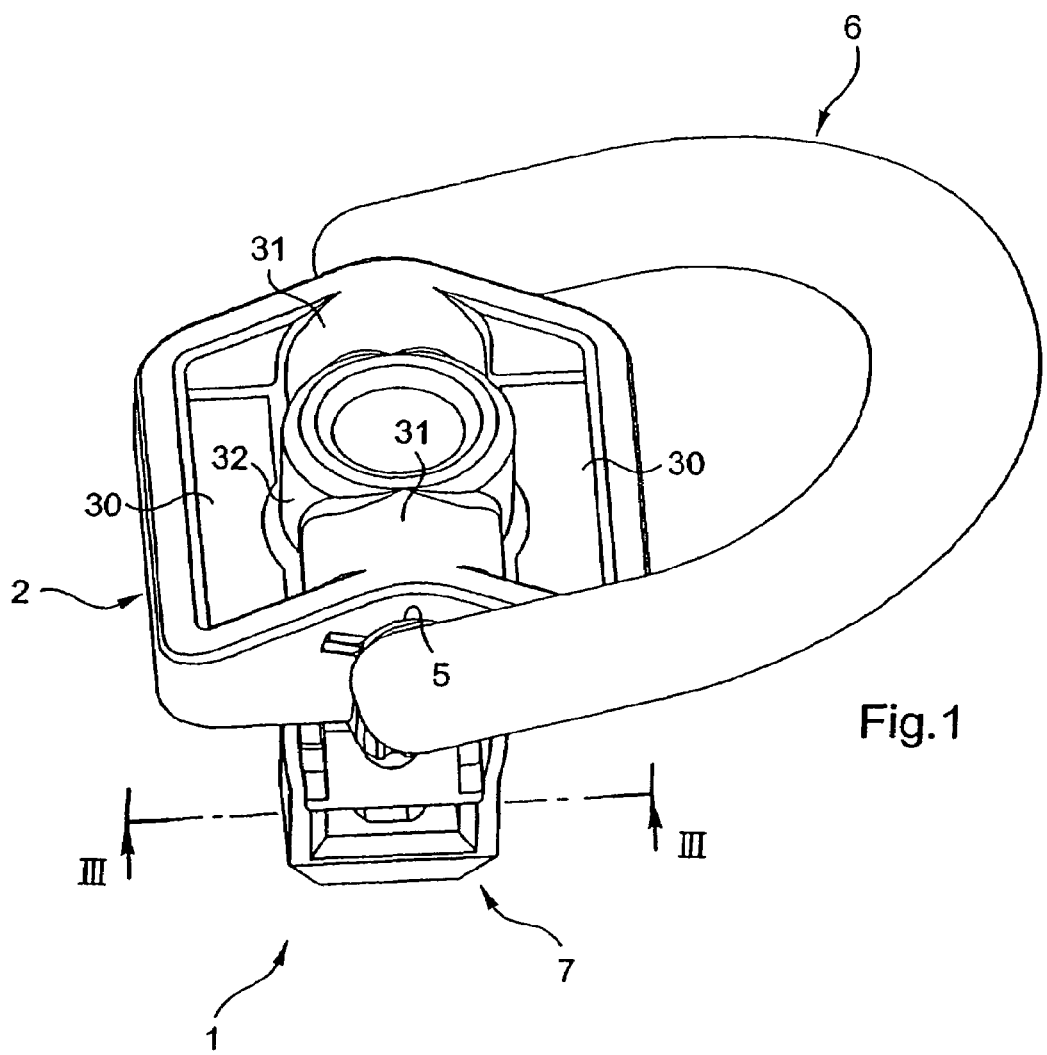
FIG. 1 is a perspective view of a fastening support including a fixing device of the invention and a fastening ring.

The fixing support 1 shown in FIGS. 1 to 4 includes a fixing device including a plastics material base 2 molded in one piece, a metal screw 3 and a square metal nut 4.

The base 2 includes two notches 5 accommodating a ring 6 and carries a fixing foot 7.

Figure 3:
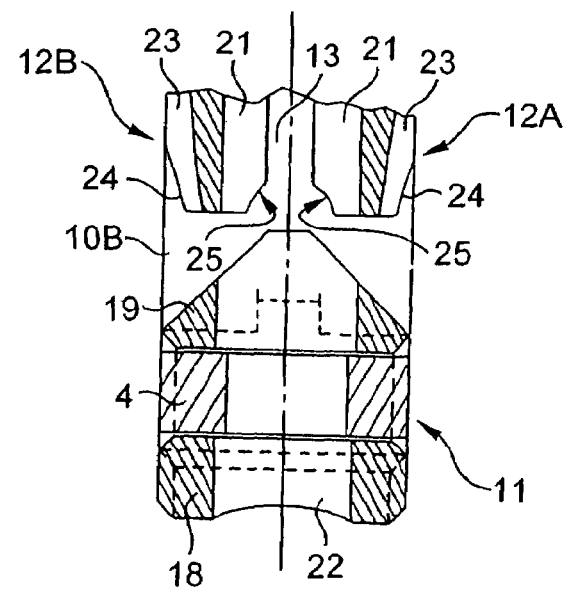
FIG. 3 is a partial view in section of the FIG. 2 foot taken along the line III-III in FIG. 1.
Figure 2:
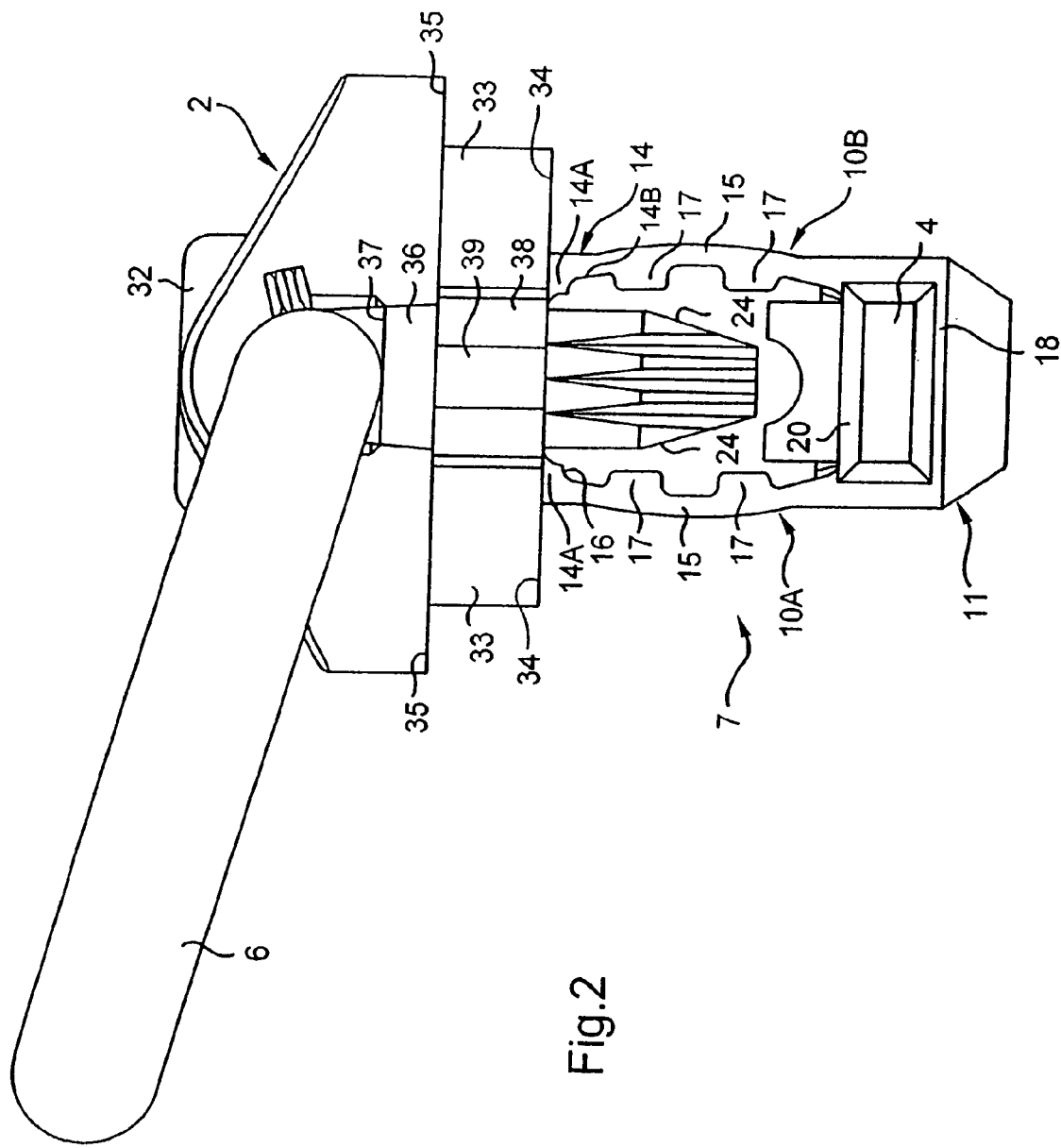
FIG. 2 is a view in elevation of the FIG. 1 support.

The foot 7 includes two pairs of mutually opposite lugs extending from the base 2, respectively one pair of lugs 10A, 10B between which a crossmember 11 is disposed and one pair of lugs 12A, 12B each of which is connected only to the base 2 and which are separated by a slot 13 (FIG. 3).

Each of the lugs 10A and 10B has a first portion 14 and a curved portion 15.

The first portion 14 includes a first section 14A followed by a second section 14B. Each of the first sections 14A extends over a certain distance from the base 2 in an axial direction corresponding to the main direction of the foot 7 (this direction also corresponds to the direction of insertion of the foot into an opening in a support member); this distance corresponds to the thickness of the support member to which the support 1 must be fixed (see FIG. 4).

The thickness (distance transverse to the axial direction in the plane of FIG. 2) of each first section 14A decreases in the direction away from the base 2. At their root on the base 2, the lugs 10A, 10B have an internal surface in contact with the lugs 12A, 12B, that internal surface diverging from the lugs 12A, 12B in the direction away from the base 2, which leaves sufficient clearance not to impede flexing of the lugs 12A, 12B.

The external surface of the lugs 10A, 10B at the level of the sections 14A, 14B is substantially plane. The thickness of the section 14B is very much less than the thickness of the section 14A. The two sections 14A, 14B are connected by a shoulder 16, which here is rounded at the section 14B end.

Still in the axial direction away from the base 2, the portion 14 is continued by the portion 15 whose external surface is slightly convex, whereas the internal surface is crenellated.

The portion 15 has on the inside two ribs 17 spaced from each other and separated by a section whose thickness is comparable to that of the second section 14B. The thickness of the portion 15 at the level of the ribs 17 is substantially twice the thickness of the second section 14B.

The lugs 10A and 10B are continued by portions connecting them to the crossmember 11.

The crossmember 11 includes a body 18 connected directly to the lugs 10A and 10B and a wedge 19 extending from the body 18 and pointing toward the slot 13 between the lugs 12A and 12B.

A housing 20 into which the nut 4 is inserted is formed in the body 18.

To enable the shank of the screw 3 to interengage with the nut 4, there is a bore 21 in the base 2 and in the lugs 12A and 12B and a bore 22 coaxial with and similar to the bore 21 through the crossmember 11.

On the inside of the lugs 12A and 12B is a recess corresponding to the bore 21. On the outside surface parallel to the slot 13 are grooves 23 facilitating interengagement of the lugs 12A, 12B with the support member to which the support 1 must be fixed.

Figure 8:
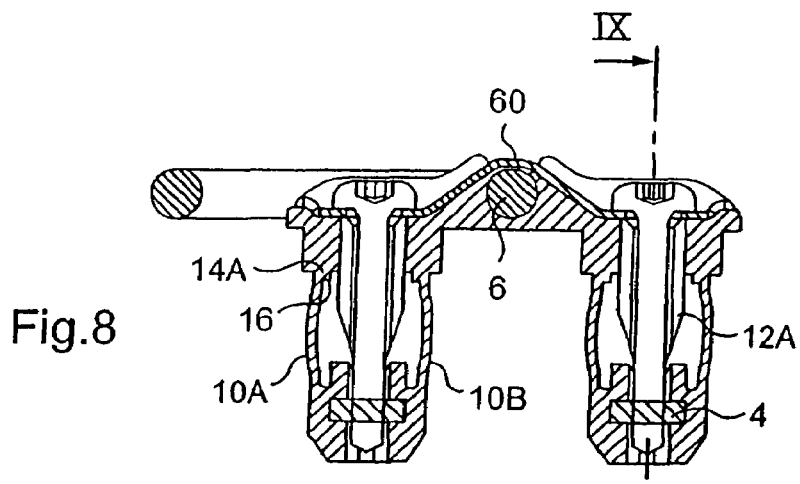
FIG. 8 is a view of the support in section taken along the line VIII-VIII in FIG. 5.

Each of the external surfaces of each lug 12A, 12B oriented transversely to the slot 13 includes an inclined portion 24 which intersects the lateral wall of the bore 21 before the free end of the lug 12A, 12B, producing a kind of chamfer 25 (FIGS. 3, 8). Given that each of the external surfaces transverse to the slot 13 of each of the lugs 12A and 12B has an inclined portion 24, there are four kinds of chamfer 25 which each form a centering surface for the wedge 19 in the direction of the slot 13.

Figure 4:
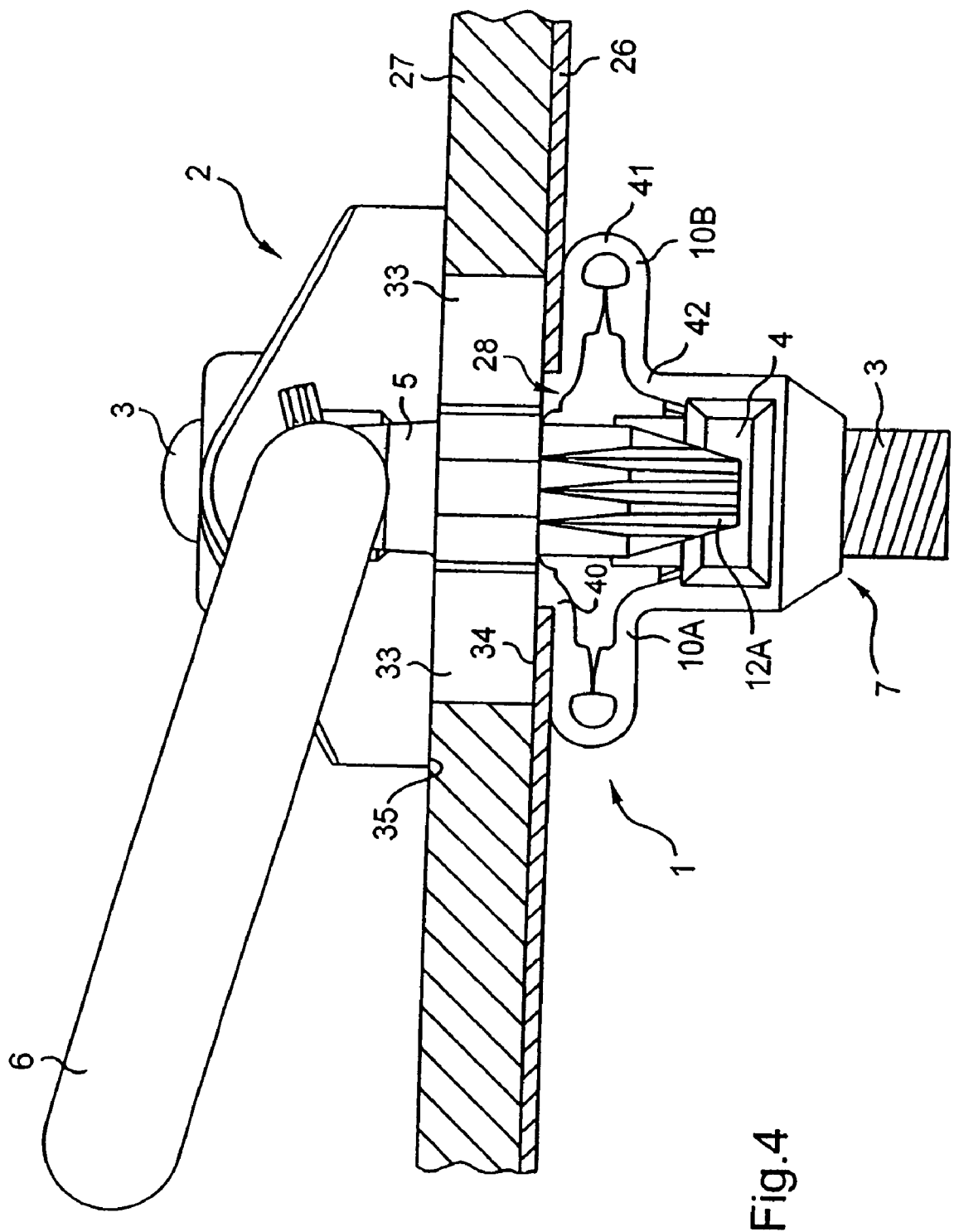
FIG. 4 is a view similar to that of FIG. 2, the support being placed on and fixed to a support member shown in section.

The support member to which the support 1 is to be fixed is a metal plate 26 (FIG. 4). A trim panel 27 covers the plate 26 and there is a rectangular hole 28 corresponding to the general section of the foot 7 in the plate 26. There is a hole wider than the hole 28 in the panel 27.

The base 2 has a globally square bottom including two rectangular plates 30 separated by a central portion including two notches 5 and a cylindrical chimney 32. The chimney 32 is at the center of the base 2 and surrounds the bore 21.

The notches 5 are oriented transversely to the chimney 32 and delimited by a wall 31 having an arch-shaped profile. They are open in the plane of the inside surface of the plates 30. The walls and the chimney are substantially the same height.

A rim on the four sides of the base 2 extends from the same side as the notches 5 and the chimney 32. On each of the two sides away from the notches 5, the rim has a height less than that of the chimney 32. On the remaining two sides, the rim has a flared V-shape the point of which coincides with the top of a respective wall 31. Each notch 5 in the rim is open at its end opposite the chimney 32.

Under each plate 30, the base 2 further includes a boss 33 molded in one piece with the remainder of the base 2. Each boss 33 has a free lower surface in which is rooted a lug 10A, 10B. The lugs 10A, 10B are rooted in the edges of the lower surfaces that are closest together. The remainder of each lower surface forms a bearing surface 34 of the base 2 on the plate 26.

The plates 30 project beyond the bosses 33 so that there is a shoulder between a boss 33 and a plate 30 defining a bearing surface 35 of the base 2 on the panel 27. The contour of the two bosses 33 is adapted to the hole in the panel 27.

The bosses 33 are connected to each other by walls 38 in line with the chimney 32 and at the ends of which the lugs 12A, 12B lie. These walls 38 have a central advancement 39 in the axial direction over which extends transversely a clipping rib 36. This rib 36 is situated at the foot of the aperture of a notch 5 and has a triangular section; its projection increases on moving away from the lugs 12A, 12B. A shoulder 37 connects the rib 36 to a portion of the chimney 32.

The plastics material ring 6 is in the shape of a stirrup having a U-shaped portion of round section. The two parallel branches are closed by two cylindrical arms and aligned with each other. As seen in FIG. 1, the notches 5 accommodate the arms of the ring 6. The diameter of the arm of the ring 6 corresponds to the distance between the shoulder 37 and the top of the notch 5, so that the arms are positioned under the ribs 36 and the arms are clipped on upon upward movement to the notches 5. The respective shapes of the arms and the notches 5 enable the arms to rotate in the notches and thus enable the ring 6 to pivot relative to the notches 5.

To fix the support 1, the foot 7 is inserted into the hole 28 until the bearing surface 34 of the base 2 bears on the surface bordering the opening 28 and its bearing surface 35 bears on the surface of the panel 27. In another embodiment that is not shown, there is a clearance between the bearing surface 35 and the surface of the panel 27.

Insertion is made possible by flexing of the curved portions 15 of the lugs 10A and 10B, which flex inwards so that they can pass through the opening 28 and then expand to achieve temporary holding in place. A tool for driving rotation of the screw 3 is then interengaged with the head of the screw 3 in order to turn the screw in the direction in which it draws the crossmember 11 toward the base 2. The farther the nut 4 rises up the shank of the screw 3, the more of the latter can be seen under the crossmember 11 (FIG. 4).

The portions 15 of the lugs 10A and 10B then flex outwards (their curvature constitutes a precursor of flexing in that direction), the wedge 18 moving towards the lugs 12A and 12B finally encountering the bevels 25, which brings about mutual centering, after which the wedge penetrates the slot 13 as such so that the lugs 12A and 12B are bent outwards, the flexing of the lugs 10A and 10B and the bending of the lugs 12A and 12B continuing for as long as the screw 3 is driven in rotation, the driving tool releasing when it reaches a predetermined torque for which the deformation is sufficient for the support 1 to have been fixed correctly. The situation is then that shown in FIG. 4, in which each of the four lugs 10A, 12A, 10B and 12B of the foot is pressed firmly onto the back of the sheet metal 26.

In this position, the lugs 10A, 10B bend in three distinct bending areas 40, 41, 42. The bending area 40 is at the level of the shoulder 16 at the junction of the first section 14A and the second section 14B. The bending area 41 is in the middle of the portion 15 between the two ribs 17. The bending area 42 is beyond the portion 15. In this position, the portion 15 is bent back upon itself so that the ribs 17 come into contact with each other, the increased thickness at the level of the ribs 17 limiting the bending angle at the level of the bending areas 41, 42 to limit the forces on that bending area and to prevent forcible passage through the hole 28.

Figure 9:
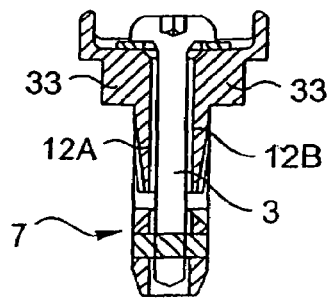
FIG. 9 is a view of the support in section taken along the line IX-IX in FIG. 8.

Note that the inclined portions 24 of the lugs 12A and 12B are such that the width of those lugs (i.e. their dimension transverse to the axis of the screw 3 in FIG. 9) progressively increases in the direction of the base 2, over virtually their whole length. A result of this is that the force necessary to press the wedge 19 into the slot 13 progressively increases as insertion proceeds. Moreover, in the event of imperfect alignment of the wedge 19 and the slot 13, the presence of the bevels 25 prevents the occurrence of a hard spot that might release the tool for driving the screw 3 even though the wedge has not yet penetrated sufficiently into the slot 13.

Once the support has been fixed, the ring can be used to fasten various members. The support is subjected to pull-off forces that it resists by virtue of the lugs and the bearing surfaces that lock the support to the support member. It is also subjected to shear forces, especially in the plane of the opening in the sheet metal 26. The surplus material of the section 14A reinforces the bending area in this plane without impeding the movement of the lugs 12A, 12B (the section is in contact with the lugs only at points at their end close to the base).

In a different embodiment, the fixing support 1 includes two feet 7. Each of the two feet 7 is identical to the foot described with reference to FIGS. 1 to 4 except for the lugs 10A, 10B, the thickness of the first section 14A whereof is constant, and the shoulder 16, which here is straight. The section 14A is not in contact with the lugs 12A, 12B allowing sufficient clearance not to impede their bending movement on fitting the support to the support member. Also, the lugs 10A, 10B have no ribs 17.

The base 2 has a globally rectangular shape and includes three square portions. Around an intermediate portion 50, the two end portions 51 each have a hole for the screw 3 to pass through, aligned with the bore 21. Under each end portion there are two bosses 33. These are narrower so that the bearing surfaces 34 are also narrower. The surface under the intermediate portion 50 is intended to bear on a trim panel so that the bearing surface 35 may also extend between the two feet.

Figure 5:
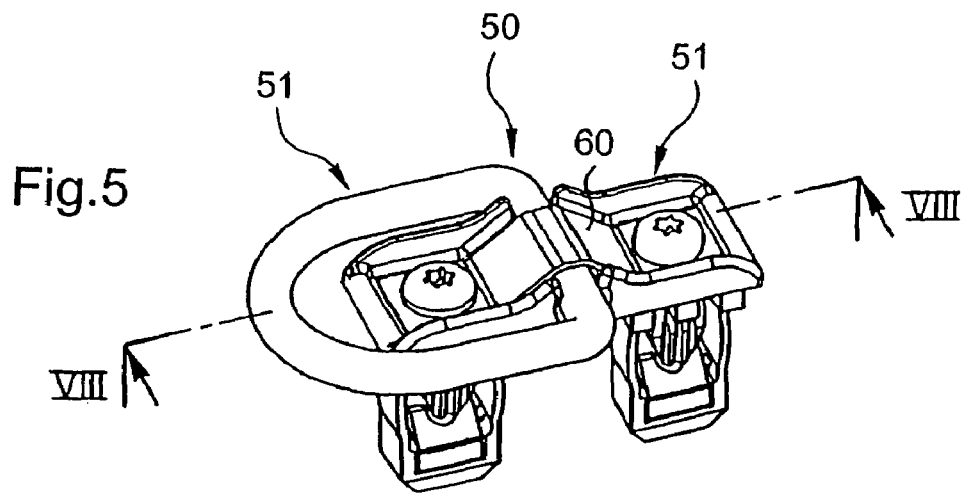
FIG. 5 is a perspective view of a different embodiment of a fixing support, the device having two identical feet at the two ends of the base of the device.
Figure 6:
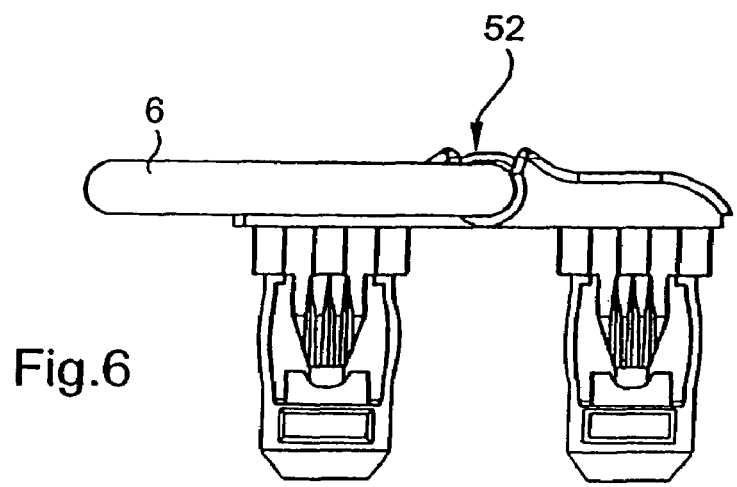
FIG. 6 is a view in elevation of the FIG. 5 support.
Figure 7:
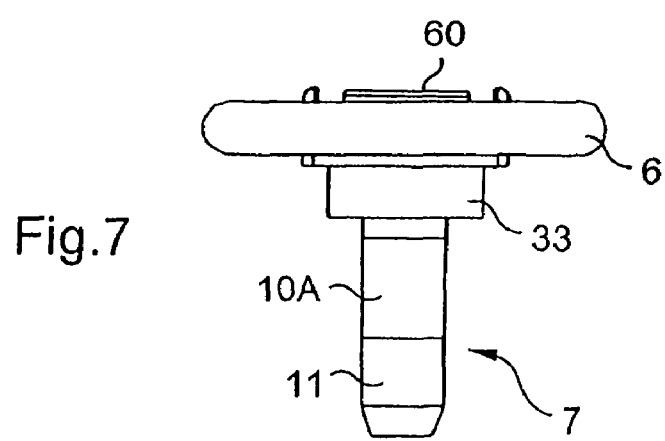
FIG. 7 is a view of the FIG. 6 support as seen from the left-hand side of the support as shown in FIG. 6.

Here the intermediate portion 50 has a solid and triangular section in the plane VIII-VIII in FIG. 5 (FIG. 8). This section points outward. There is a circular section groove in the intermediate portion 50. The groove is open to the outside and is adapted to accommodate the ring 6.

The rim has a V-shape primarily at the sides of the intermediate portion. This rim has two round cut-outs 52 aligned with the groove. They are open toward the outside of the base 2 and are intended to receive the ring 6 whose two parallel branches are connected by a straight portion.

The fixing support further includes a metal reinforcing blade 60 whose shape is globally adapted to that of the base 2. The blade 60 includes two holes at its two ends. The central area of the blade 60 is of flared V-shape corresponding to the shape of the portion 50. When the ring 6 is placed in the cut-outs and the blade 60 is positioned on the base 2, the holes in the blade 60 are lined up with the holes in the end portions 51 so that the shank of the screw 3 may be passed through them. The heads of the screws 3 immobilize the blade 60 against the base 2 and the blade 60 locks the ring 6 in the housing delimited by the cut-outs, the surface of the groove of the intermediate portion 50 and the blade 60. Because of the corresponding shapes of the section of the ring, the groove and the cut-outs, the ring 6 is free to rotate even though it is retained in the base 2.

The support member (not shown) to which the support 1 is fixed includes a metal plate and a trim panel covering the plate, there being two rectangular holes each corresponding to the general section of a foot 7 in the panel and in the plate.

To fix the support 1, each foot 7 is inserted into a hole until the base 2 bears at least through its bearing surface 34 on the surface bordering the aperture and through its bearing surface 35 on the surface of the panel.

Using a tool for driving rotation of the screws 3 interengaged with the head thereof, the screw is turned in the direction in which it entrains the crossmember 11 toward the base 2 at the same time as locking the blade 60 to the base 2.

Figure 10:
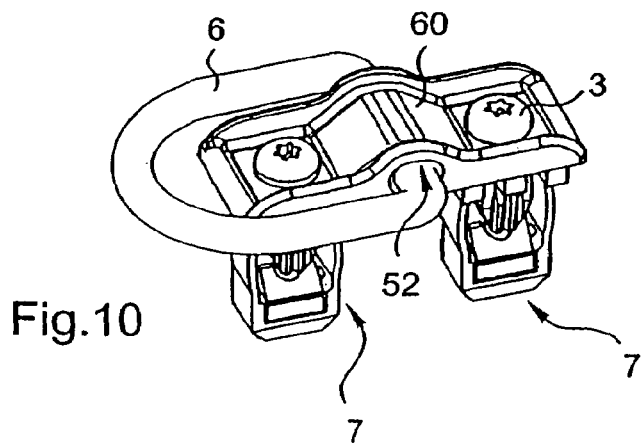
FIG. 10 is a view similar to that of FIG. 5 of a different embodiment of the FIG. 4 support, the notch accommodating the fastening ring being open on the same side as the feet.
Figure 11:
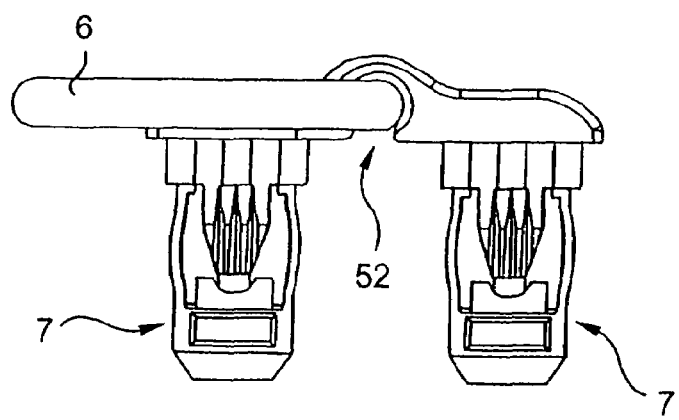
FIG. 11 is a view in elevation of the FIG. 10 support.

In a variant of this embodiment (FIGS. 10 and 11), the groove of the intermediate portion and the cut-outs are open toward the feet 7. The blade 60 then has a reinforcing role. When the support 1 is placed in position on the support member, the ring 6 is maintained in a housing delimited by the cut-outs, the surface of the groove in the portion 50 and the trim panel.

In a variant that is not shown, the blade receives signs (logos, slogans) on its visible surface.

In another embodiment, the lugs 10A, 10B have ribs similar to the ribs 17 of the foot 7 represented in FIGS. 1 to 4.

In another variant represented in FIGS. 1 to 4, the lugs 10A, 10B have no ribs 17.

In a variant of the embodiments described, the first section 14A and the shoulder 16 are different shapes.

The invention claimed is:

1. A device for fixing a fastening ring to a support member, comprising:
   a base configured to bear on a surface bordering at least one opening of predetermined shape in said support member, said base including a pivotal mounting element for a ring;
   at least one foot carried by said base, said foot adapted to be inserted in an axial direction into the at least one opening in said support member said foot including:
      a first pair of mutually opposed lugs extending from said base,
      a crossmember disposed between the lugs of said pair, and
      a second pair of mutually opposed lugs each connected exclusively to the base and separated by a slot,
      wherein said crossmember that faces the lugs of said second pair includes a wedge pointing toward said slot,
      wherein the lugs of said first pair are configured to bend when said crossmember is driven toward the base, and
      wherein the lugs of said second pair are configured to flex outward when the wedge of said crossmember is pushed into said slot; and
   at least one rod, said rod configured to enter a bore formed through said base and between said lugs of said second pair of said foot and engage with said crossmember, to drive it toward the base; and
   each of said lugs of said first pair including a first section on the side of said base whose height in said axial direction corresponds to that of said support member and a thinner second section away from said base, each of said lugs of said first pair having, internally, a shoulder transverse to said axial direction and uniform over the whole of the width of said lug, said shoulder forming a transition between said first section and said second section.

2. The device according to claim 1, wherein said base includes, on the outside of said lugs of said first pair, a bearing surface projecting on either side of those lugs.

3. The device according to claim 2, wherein each lug of said first pair is rooted on a boss of said base, each featuring said bearing surface, said base featuring a second bearing surface projecting from said bosses.

4. The device according to claim 1, wherein said crossmember is of plastics material and includes a body from which said wedge extends, a housing being formed in said body, said rod is of metal and threaded and said device further includes, inserted in said housing, a metal nut with which said rod is engaged.

5. The device according to claim 2, wherein said pivotal mounting element of said ring include two notches, each of said notches being adapted to receive a respective end arm of said ring.

6. The device according to claim 5, wherein each notch has an arched profile.

7. The device according to claim 5, wherein said notches are open on the side of said bearing surface and each notch is on a respective opposite edge of said base.

8. The device according to claim 5, wherein said foot is disposed at the center of said base and the two notches are disposed on either side of said bore.

9. The device according to claim 2, wherein it features in addition to said bore and said foot forming a first bore/foot assembly, a second bore/foot assembly, each disposed at one end of said base.

10. The device according to claim 9, wherein it further includes a metal blade having at each of its ends an orifice for the passage of said rod of a respective foot, said blade being engaged between said base and the head of each of said rods.

11. The device according to claim 1, wherein said base being generally rectangular, said pivotal mounting element include at least one notch adapted to accommodate a portion of said ring situated between said bores and oriented in the widthwise direction of said base.

12. The device according to claim 11, wherein said pivotal mounting element are open on the side of said bearing surface and on each of two opposite edges of said base.

13. The device according to claim 11, wherein it further includes a metal blade having at each of its ends an orifice for the passage of said rod of a respective foot, said blade being engaged between said base and the head of each of said rods, and in that said pivotal mounting element comprise a notch open onto the edges of said base and onto the side of said base opposite said bearing surface, said notch being adapted to accommodate a portion of said ring, said portion being engaged between said notch and said blade.

14. The device according to claim 1, wherein each of said lugs of said first pair including a first bending area at the level of said shoulder, a second bending area at the level of said crossmember, and a third bending area half way between said first bending area and said second bending area, each of said lugs of said first pair includes, internally, a rib between said first bending area and said third bending area and a rib between said second bending area and said third bending area, said ribs being adapted to come into contact with each other when said lugs are bent.

15. The device according to claim 1, further comprising a fastening ring in the form of a stirrup retained in the pivotal mounting element.

* * * * *